(12) United States Patent
Woodford

(10) Patent No.: US 9,316,330 B2
(45) Date of Patent: Apr. 19, 2016

(54) APPARATUS FOR FLOW REGULATION

(75) Inventor: Keith Donald Woodford, Aberdeen (GB)

(73) Assignee: TCO AS, Indre Arna (NO)

(*) Notice: Subject to any disclaimer, the term of this patent is extended or adjusted under 35 U.S.C. 154(b) by 297 days.

(21) Appl. No.: 13/704,926

(22) PCT Filed: Jun. 15, 2011

(86) PCT No.: PCT/GB2011/000894
§ 371 (c)(1),
(2), (4) Date: Mar. 6, 2013

(87) PCT Pub. No.: WO2011/157985
PCT Pub. Date: Dec. 22, 2011

(65) Prior Publication Data
US 2013/0153044 A1 Jun. 20, 2013

(30) Foreign Application Priority Data

Jun. 17, 2010 (GB) .................................. 1010179.8

(51) Int. Cl.
F16K 15/00 (2006.01)
F16K 31/122 (2006.01)
G05D 7/01 (2006.01)
E21B 34/08 (2006.01)
E21B 34/10 (2006.01)
E21B 37/06 (2006.01)
E21B 41/02 (2006.01)

(52) U.S. Cl.
CPC ............. *F16K 31/1221* (2013.01); *E21B 34/08* (2013.01); *E21B 34/10* (2013.01); *E21B 37/06* (2013.01); *E21B 41/02* (2013.01); *G05D 7/0133* (2013.01); *Y10T 137/0396* (2015.04); *Y10T 137/7768* (2015.04)

(58) Field of Classification Search
CPC ... F16K 31/1221; G05D 7/0133; E21B 34/08; E21B 37/06; E21B 41/02; E21B 34/10; Y10T 137/0396; Y10T 137/7768; Y10T 137/7798; Y10T 137/7796; Y10T 137/7806; Y10T 137/7805; Y10T 137/7788; Y10T 137/7792
USPC .......... 137/501, 504, 505.13, 505.15, 505.18, 137/505.22, 505.23
See application file for complete search history.

(56) References Cited

U.S. PATENT DOCUMENTS

| 3,227,172 A | * | 1/1966 | Sims et al. ................. 137/116.3 |
| 3,456,681 A | * | 7/1969 | Faisandier .................... 137/489 |
| 3,873,063 A | * | 3/1975 | Illing ........................... 251/282 |
| 4,887,638 A | * | 12/1989 | Hellquist et al. ......... 137/505.13 |

(Continued)

FOREIGN PATENT DOCUMENTS

| EP | 2166423 | 3/2010 |
| GB | 2042134 | 9/1980 |
| GB | 2238848 | 6/1991 |

*Primary Examiner* — Jessica Cahill
(74) *Attorney, Agent, or Firm* — Dinsmore & Shohl LLP

(57) ABSTRACT

An apparatus for regulating the flow of a fluid from a source to a target location comprises a housing defining a fluid inlet configured to communicate with a fluid source and a fluid outlet configured to communicate with a target location, and a flow path extending between the fluid inlet and fluid outlet. An inlet valve assembly is mounted in the flow path and comprises a valve seat and a valve member configured to cooperate with the valve seat to regulate flow through the flow path. A balance arrangement is provided and is configured to balance the effect of fluid pressure acting on the inlet valve assembly.

40 Claims, 5 Drawing Sheets

(56) References Cited

U.S. PATENT DOCUMENTS

| | | | |
|---|---|---|---|
| 5,135,023 A * | 8/1992 | Ross | 137/505.11 |
| 5,301,713 A | 4/1994 | Skoglund | |
| 5,487,405 A * | 1/1996 | Skoglund | 137/501 |
| 5,878,777 A | 3/1999 | Skoglund | |
| 5,931,186 A * | 8/1999 | Skoglund | 137/486 |
| 7,059,343 B2 * | 6/2006 | Carroll | 137/505.25 |
| 7,192,665 B2 * | 3/2007 | Nakajima et al. | 429/444 |
| 2004/0154667 A1 * | 8/2004 | Vitale | 137/505.18 |

\* cited by examiner

APPARATUS FOR FLOW REGULATION

FIELD OF THE INVENTION

The present invention relates to an apparatus, such as an injection or fluid handling apparatus, for regulating fluid flow between a fluid source and a target region. In particular, though not exclusively, the present invention relates to an apparatus for regulating fluid flow between a common fluid source and multiple target regions.

BACKGROUND TO THE INVENTION

It is desirable in many circumstances to deliver a fluid to a pressurized target location at a fixed flow rate. This may be achieved by communicating fluid from a pressurised source to the target location via a flow restriction or orifice. In such a case the flow rate is, generally, a function of a flow coefficient of the restriction and the pressure differential between the fluid source and target location. The flow rate through a restriction or orifice may be formulaically expressed by:

$$Q = K\sqrt{\frac{\Delta P}{Sg}}$$

Where:
Q=flow rate
K=flow coefficient of the restriction
$\Delta P$=the differential pressure over the flow restriction
Sg=specific gravity of the fluid.

In many applications the specific gravity of the fluid will be constant. Accordingly, it will be recognised that if the flow restriction and the pressure differential are fixed, then a steady state flow rate from the source to the target may be achieved. However, in some circumstances one or both of the source and target location pressures may vary or fluctuate, thus causing a variation in the pressure differential. This will result in fluctuations in the flow rate which may be undesirable.

To address the issue of fluctuating flowrates, it is possible to employ a variable flow restriction which is varied in accordance with variations in the differential pressure. However, such an arrangement typically requires the use of complex control equipment for monitoring the various pressures and operating some form of actuator to vary the flow restriction accordingly.

An alternative approach is to ensure that a constant pressure differential is applied across a fixed flow restriction, irrespective of pressure fluctuations at the source and target. An apparatus for use in such a known approach, which is similar to that disclosed in GB 2 238 848, will now be described with reference to FIGS. 1 and 2, wherein FIG. 2 provides an enlarged view of a portion of the apparatus of FIG. 1.

The apparatus, generally identified by reference numeral 210, includes a piston member 212 mounted to stroke within a bore 214 formed within a valve housing 216, wherein a seal 218 is provided between the piston member 212 and the bore wall. The piston member 212 and housing 216 collectively define a lower chamber 220 and an upper chamber 222, isolated from each other by the piston seal 218. The housing defines a fluid inlet 224 which receives fluid from a fluid source 226 and communicates with the lower chamber 220, such that the pressure of fluid within the lower chamber 220 acts against the piston 212, on the area defined by the seal 218, establishing an upward force. As will be discussed in further detail below, the pressure of the fluid is conditioned within the lower chamber upon movement of the piston 212.

The fluid inlet 224 comprises an inlet valve 228 having a spring mounted ball 230 which cooperates with a ball seat 232 to control the inflow of fluid into the lower chamber 220. A pin 234 extends from a lower side of the piston 212 and in use functions to displace the ball 230 relative to its seat 232, upon movement of the piston 212, to vary the flow into the lower chamber 220.

The housing 216 further defines a fluid outlet 236 for the fluid to be delivered from the lower chamber 220 to an inlet 238 of an external fixed flow restrictor 240, wherein fluid from an outlet 242 of the flow restrictor 240 is delivered to a target location 244. The flow restrictor 240 is arranged to deliver fluid to the target location 244 at a desired flow rate.

The housing 216 also defines a further inlet 246 which communicates fluid, or fluid pressure, from the downstream side of the flow restrictor (which will be at the target location pressure) into the upper chamber 222, wherein the fluid pressure will act against the piston 212, on the area defined by the seal 218, establishing a downward force.

The apparatus 210 further comprises a bias spring 248 located within the upper chamber 222 and arranged to establish a downward force on the piston. An adjustor mechanism 250 is provided to vary the bias force of the spring 248.

In use, prior to any flow the bias spring 248 will force the piston 212 downward such that the ball 230 of the inlet valve 228 is lifted from its seat 232 by engagement with the pin 234. On start-up fluid from the fluid source 226 will flow through the inlet valve 228 and into the lower chamber 220 to provide an upward force on the piston 212, which will be opposed by the force of the spring and also the force established by the target location pressure acting in the upper chamber 222. During a dynamic period the piston 212 will be displaced, thus displacing the ball 230 of the valve 228 via the piston pin 234 to regulate the inlet fluid until an equilibrium condition is established. In such an equilibrium condition the forces acting on the piston 212 will be balanced. As the fluid pressure above and below the piston 212 act on an equal seal area, the fluid within the lower chamber will thus be a fixed value above the target location pressure by an amount determined by the force of the spring. Any variations in the pressure at either or both of the source 226 and target location 244 will be accommodated by adjustment of the piston 212 and inlet valve 228 to continuously maintain equilibrium. As such, a constant pressure differential will be applied across the restrictor 240 permitting a constant flow rate to be achieved.

As noted above, the inlet valve 228 is opened by downward movement of the piston 212. However, for the piston 212 to lift the ball 230 from its seat 232 it must overcome the inlet pressure which will be acting on the ball 230 over the area of the seat 232. The effect of the inlet pressure will therefore apply a force against the piston, which may vary as the piston pin 234 engages and disengages the ball 230 when in use. The present inventor has identified this as an adverse issue in that the effect of this varying force established by the inlet pressure acting against the seat 232 will result in variations in the fluid pressure within the lower chamber, and thus adverse variations in the pressure differential across the flow restrictor 240. Such variations in the pressure differential will result in variations in the flow rate.

The effect of the inlet pressure acting against the valve seat may be addressed by forming the apparatus 210 to ensure a large ratio between the area of the piston 212 and the area of the valve seat 232, to minimise the pressure variation effect. However, this establishes the requirement to use a relatively large piston which necessitates a correspondingly large housing. In typical high pressure applications, such as may be experienced in the oil and gas industry, a typical housing size may be far in excess of 75 mm (3 inches). This therefore renders the known apparatus 210 to be generally unsuitable for downhole applications, where target housing sizes may be in the region of 25 mm (1 inch).

It may also be desirable to deliver a fluid at a fixed flow rate to multiple target locations at different pressures. This may be the case in the oil and gas industry, for example where an injection fluid must be injected into different formation zones. One known arrangement for such multiple zone injection is to utilise multiple injection devices which are fed by multiple feed lines. However, this requires the availability of space to accommodate the multiple feed lines, which may be undesirable, and perhaps not achievable in typical downhole environments. It is therefore preferred in some circumstances to utilise a common feed line which delivers fluid to multiple injection devices. However, even where such common feed systems are desired, they may not practically be implemented in view of the typical sizes of injection device, as noted above.

SUMMARY OF THE INVENTION

According to a first aspect of the present invention there is provided an apparatus for regulating the flow of a fluid from a source to a target location, comprising:

a housing defining a fluid inlet configured to communicate with a fluid source and a fluid outlet configured to communicate with a target location;

a flow path extending between the fluid inlet and fluid outlet;

an inlet valve assembly mounted in the flow path and comprising a valve seat and a valve member configured to cooperate with the valve seat to regulate flow through the flow path; and a balance arrangement configured to balance the effect of fluid pressure acting on the inlet valve assembly.

The balance arrangement may be configured to balance the effect of fluid pressure acting on the area of the valve seat.

Accordingly, operation of the inlet valve assembly, for example movement of the valve member to regulate flow through the flow path, may be achieved without significant effect from pressure acting over the area of the valve seat, which may otherwise adversely affect the consistency of the flow rate through the apparatus.

The apparatus may be configured for regulating flow of a fluid from a fluid source to a pressurised target location. The apparatus may be configured for establishing a substantially constant flow rate of fluid to the target location. The apparatus may be configured for establishing a substantially constant flow rate of fluid to the target location, irrespective of variations in the pressure of one or both of the source and target locations. The apparatus may define a regulator valve apparatus. The apparatus may define an injection valve apparatus configured to permit injection of a fluid into the target location.

The balance arrangement may be configured to establish a force to oppose the force applied or established by pressure acting on the inlet valve assembly, for example on the area of the valve seat.

The balance arrangement may comprise a fluid actuated balance arrangement. The balance arrangement may comprise a piston arrangement. The balance arrangement may comprise a piston arrangement defining a piston balance area, wherein the piston balance area and the area of the valve seat are configured to be exposed to a common pressure. The common pressure may comprise fluid inlet pressure, which may be fluid pressure at the source location. The piston balance area may be selected in accordance with the area of the valve seat. In one embodiment the piston balance area may be substantially equal to the area of the valve seat. This may permit substantially complete neutralisation of the effect of fluid pressure on the inlet valve assembly. In other embodiments the piston balance area may be larger or smaller than the area of the valve seat. This may permit a preferential bias force within the apparatus to be established in accordance with a user preference.

The apparatus may comprise a flow control member moveably mounted within the housing and configured to operate the inlet valve assembly. The flow control member may be configured to move the valve member relative to the valve seat to vary the flow through the flow path. The flow control member may be provided separately from the valve member and configured to engage the valve member. In other embodiments the flow control member and valve member may be integrally formed. The balance arrangement may be configured to balance any force applied to the flow control member by the effect of pressure acting on the inlet valve assembly, for example on the area of the valve seat. Accordingly, operation of the flow control member may be achieved substantially without interference from the effects of the fluid pressure acting on the inlet valve assembly.

The flow control member may be configured to be displaced by fluid pressure. The flow control member may be configured to be displaced by variations in fluid pressure, such as variations in at least one of the source fluid pressure and target region fluid pressure. This may permit the flow control member to operate the inlet valve assembly to accommodate such changes in fluid pressure. This may assist in maintaining a consistent flow rate through the flow path. The flow control member may be configured to operate the inlet valve assembly to achieve an equilibrium position. The equilibrium position may be established by a constant pressure differential across the flow control member.

The apparatus may comprise a first fluid chamber located on an upstream side of flow control member, and a second fluid chamber located on a downstream side of the flow control member. The flow control member may be configured to be displaced by fluid pressure within the first and second fluid chambers. The first fluid chamber may be configured to receive fluid from the inlet valve assembly and the second fluid chamber may be configured to communicate fluid to the fluid outlet.

The apparatus may comprise a seal arrangement configured to isolate the first and second fluid chambers. The seal arrangement may comprise a dynamic seal arrangement configured to accommodate movement of the flow control member relative to the housing. The seal arrangement may establish defined piston areas associated with the flow control member, wherein fluid pressure acting over the associated piston areas establishes a corresponding force on the flow control member.

Fluid pressure within the first fluid chamber may generate an associated force on the flow control member to bias said member in a downstream direction. Fluid pressure within the second fluid chamber may generate an associated force on the flow control member to bias said member in an upstream direction. The flow control member may be configured to be displaced by variations in the pressure within one or both of the first and second fluid chambers.

The apparatus may comprise a bias arrangement configured to apply a bias force to the flow control member in a preferred direction. The bias force may be configured to establish a differential pressure across the flow control member. In one embodiment the bias arrangement may be configured to apply a bias force to the flow control member in an upstream direction. In such an arrangement force equilibrium of the flow control member may be achieved when the combined forces of the bias arrangement and the pressure force within the second chamber are equivalent to the pressure force within the first fluid chamber. In such an embodiment the bias arrangement may be configured to establish a pressure differential across the flow control member, wherein the pressure differential may be a function of the bias force of the bias arrangement. For example, the pressure within the first chamber may be greater than the pressure within the second chamber by a value associated with the bias arrangement.

The bias arrangement may be configured to provide a fixed bias force. The bias arrangement may be configured to provide a variable bias force. The bias arrangement may be configured to be variable, for example to vary the bias force. The bias arrangement may be adjustable.

The apparatus may comprise an adjustor configured to adjust the bias force of the bias arrangement.

The bias arrangement may comprise a spring. The bias arrangement may comprise any suitable means capable of applying a fixed or variable force, such as an elastomer member, piston assembly, gas spring or the like.

The balance arrangement may be at least partially provided or defined by the flow control member. In one embodiment the flow control member may define a piston balance area, wherein the piston balance area and inlet valve assembly are configured to be exposed to a common pressure, such as the pressure at the fluid source. The piston balance area may be established by a profiled section on the flow control member, such as a stepped portion. The piston balance area may be defined by an annular area. The piston balance area may be associated with a sealing arrangement, for example the same sealing arrangement configured to isolate first and second chambers on opposing sides of the flow control member. The piston balance area may, for example, be provided between two seals, such as two seals defining a differential piston area corresponding to the piston balance area.

The flow control member may comprise a pin.

The flow control member may be mounted within the flow path of the apparatus.

The flow control member may comprise a conduit configured to define a portion of the flow path of the apparatus. The conduit may comprise an internal conduit within the flow control member. The conduit may provide communication between first and second chambers on opposing sides of the flow control member.

The apparatus may comprise a flow restrictor. The flow restrictor may define a restriction to flow. The flow restrictor may define a fixed restriction to flow. The flow restrictor may define a variable restriction to flow. The flow restrictor may be configured to be varied or adjusted. In such an arrangement the flow restrictor may be adjusted to provide a predetermined restriction to flow, which may remain fixed when in use. The flow restrictor may be adjusted to provide an initial restriction to flow, which may then be varied when in use.

The flow restrictor may be adapted to be exposed to a differential pressure, for example a differential pressure associated with the flow control member. The flow restrictor may be configured to establish a desired rate of flow of fluid through the apparatus between the source and target location, for example a fixed flow rate, a flow rate in accordance with a desired flow profile or the like.

The flow restrictor may be mounted externally of the housing. The flow restrictor may be mounted internally of the housing. The flow control member may be mounted within the flow path within the housing.

In one embodiment the flow restrictor may be mounted within the flow control member, for example within an internal conduit of the flow control member. This arrangement may eliminate or minimise the requirement to provide external components. The flow restrictor may be mounted within an internal conduit of the flow control member which extends between first and second chambers on either side of the flow control member. In such an embodiment the flow restrictor may be exposed to a differential pressure between the first and second chambers, which in combination with the dimension of a flow restriction associated with the flow restrictor will determine a flow rate through the apparatus.

The flow restrictor may be mounted within an internal conduit of the flow control member which extends between first and second chambers on either side of the flow control member, wherein the flow restrictor is configured to establish a back pressure within the first fluid chamber. Such a back pressure may contribute to the forces applied to the flow control member in a downstream direction.

The apparatus may comprise one or more check valves. The one or more check valves may define one way valves, permitting fluid flow in a single direction. The one or more check valves may be mounted within the housing of the apparatus.

The housing of the apparatus may be provided as a single component. Alternatively, the housing may be provided in multiple components. This may provide a modular form providing added flexibility.

The apparatus may be configured for use within a fluid delivery system configured to deliver fluid from a single fluid source to multiple target locations, which target locations may define different pressures. The system may comprise multiple apparatus according to the first aspect, wherein the inlet of each apparatus is coupled to a single fluid source, and the outlet of each apparatus is coupled to a respective target location.

The apparatus may be configured for use within a wellbore, for example for use in delivering a fluid to a downhole location, such as downhole equipment, a formation region or the like.

According to a second aspect of the present invention there is provided a method for regulating flow between a source and a target location, comprising:

providing an apparatus having a housing defining a fluid inlet configured to communicate with a fluid source and a fluid outlet configured to communicate with a target location, and a flow path extending between the fluid inlet and fluid outlet;

delivering fluid into the fluid inlet and through an inlet valve assembly comprising a valve seat and a valve member configured to cooperate with the valve seat to regulate flow through the flow path; and exposing the inlet valve assembly and a balance arrangement within the apparatus to a common fluid pressure to balance the effect of fluid pressure acting on inlet valve assembly.

Features and defined and implied methods of use of the apparatus according to the first aspect may be applied to the method according to the second aspect.

According to a third aspect of the present invention there is provided a fluid delivery system, comprising:

a common fluid source;

at least two apparatus according to the first aspect, wherein the fluid inlet of each apparatus is coupled to the common fluid source, and the outlet of each apparatus is coupled to respective target locations.

The fluid delivery system may be configured for use within a wellbore.

According to a fourth aspect of the present invention there is provided an apparatus for regulating the flow of a fluid from a source to a target location, comprising:

a housing defining a fluid inlet configured to communicate with a fluid source and a fluid outlet configured to communicate with a target location;

a flow path extending between the fluid inlet and fluid outlet;

an inlet valve assembly mounted in the flow path and comprising a valve seat and a valve member configured to cooperate with the valve seat to regulate flow through the flow path; and a flow restrictor mounted within the flow path and configured to be exposed to a pressure differential across said flow restrictor.

It should be noted that features defined in accordance with the first aspect may apply to the apparatus according to the fourth aspect.

The apparatus may comprise a flow control member moveably mounted within the housing and configured to operate the inlet valve assembly. The flow restrictor may be associated with the flow control member.

The apparatus may comprise a first fluid chamber located on an upstream side of flow control member, and a second fluid chamber located on the downstream side of the flow control member. The flow control member may be configured to be displaced by fluid pressure within the first and second fluid chambers. The first fluid chamber may be configured to receive fluid from the inlet valve assembly and the second fluid chamber may be configured to communicate fluid to the fluid outlet.

The apparatus may comprise a seal arrangement configured to isolate the first and second fluid chambers.

The flow control member may comprise a pin.

The flow control member may be mounted within the flow path of the apparatus.

The flow control member may comprise a conduit configured to define a portion of the flow path of the apparatus. The flow restrictor may be mounted within the conduit of the flow control member. The conduit may comprise an internal conduit within the flow control member. The conduit may provide communication between first and second chambers on opposing sides of the flow control member.

The flow restrictor may define a restriction to flow. The flow restrictor may define a fixed restriction to flow. The flow restrictor may define a variable restriction to flow. The flow restrictor may be configured to be varied or adjusted. In such an arrangement the flow restrictor may be adjusted to provide a predetermined restriction to flow, which may remain fixed when in use. The flow restrictor may be adjusted to provide an initial restriction to flow, which may then be varied when in use.

The flow restrictor may be adapted to be exposed to a differential pressure, for example a differential pressure associated with the flow control member. The flow restrictor may be configured to establish a desired rate of flow of fluid through the apparatus between the source and target location, for example a fixed flow rate, a flow rate in accordance with a desired flow profile or the like.

The flow restrictor may be mounted within an internal conduit of the flow control member which extends between first and second chambers on either side of the flow control member. In such an embodiment the flow restrictor may be exposed to a differential pressure between the first and second chambers, which in combination with the dimension of a flow restriction associated with the flow restrictor will determine a flow rate through the apparatus.

The flow restrictor may be configured to establish a back pressure within the first fluid chamber. Such a back pressure may contribute to the forces applied to the flow control member in a downstream direction.

According to a fifth aspect of the present invention there is provided a method for regulating flow between a source and a target location, comprising:

providing an apparatus having a housing defining a fluid inlet configured to communicate with a fluid source and a fluid outlet configured to communicate with a target location with a flow path extending between the fluid inlet and fluid outlet, and comprising a flow control member mounted within the flow path;

delivering fluid into the fluid inlet and through an inlet valve assembly comprising a valve seat and a valve member configured to cooperate with the valve seat to regulate flow through the flow path; and flowing the flow through a flow restrictor within the flow control member.

Features and defined and implied methods of use of the apparatus according to the fourth aspect may be applied to the method according to the second aspect.

According to a sixth aspect of the present invention there is provided a fluid delivery system, comprising:

a common fluid source;

at least two apparatus according to the fourth aspect, wherein the fluid inlet of each apparatus is coupled to the common fluid source, and the outlet of each apparatus is coupled to respective target locations.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
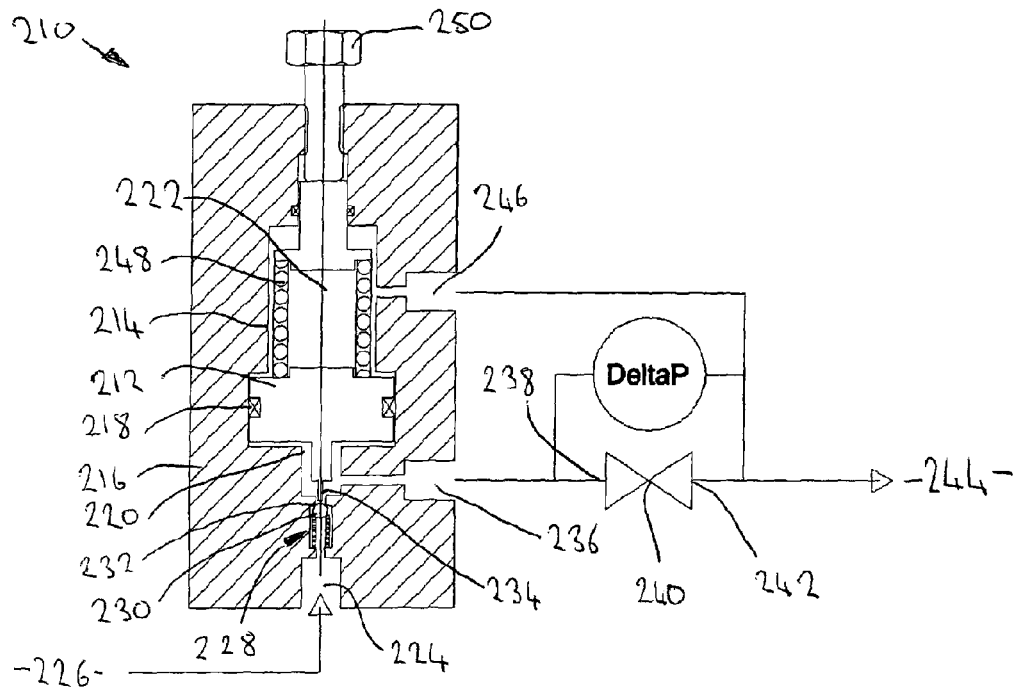
FIG. 1 is a diagrammatic cross-sectional view of a known pressure reducing valve.
Figure 2:
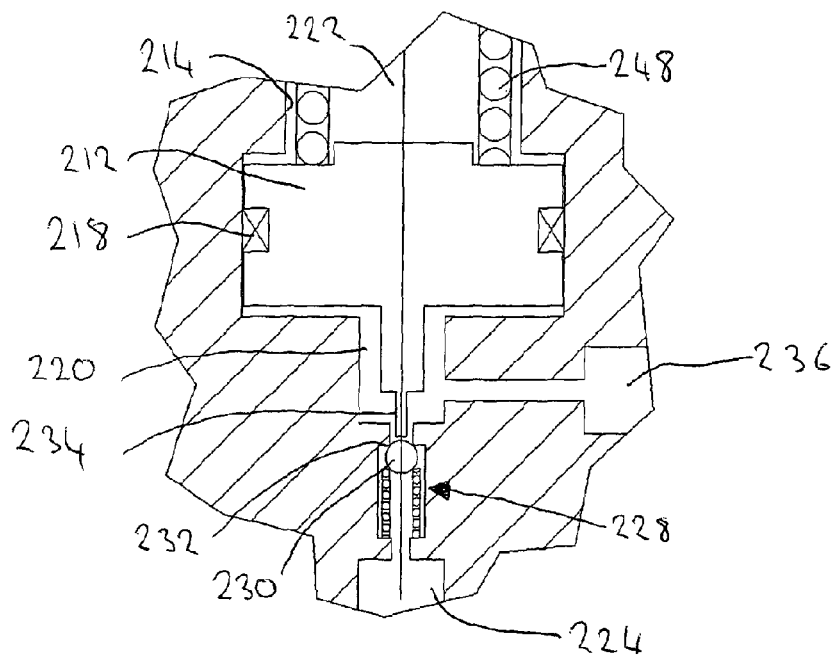
FIG. 2 is an enlarged view of a portion of the valve shown in FIG. 1.
Figure 3:
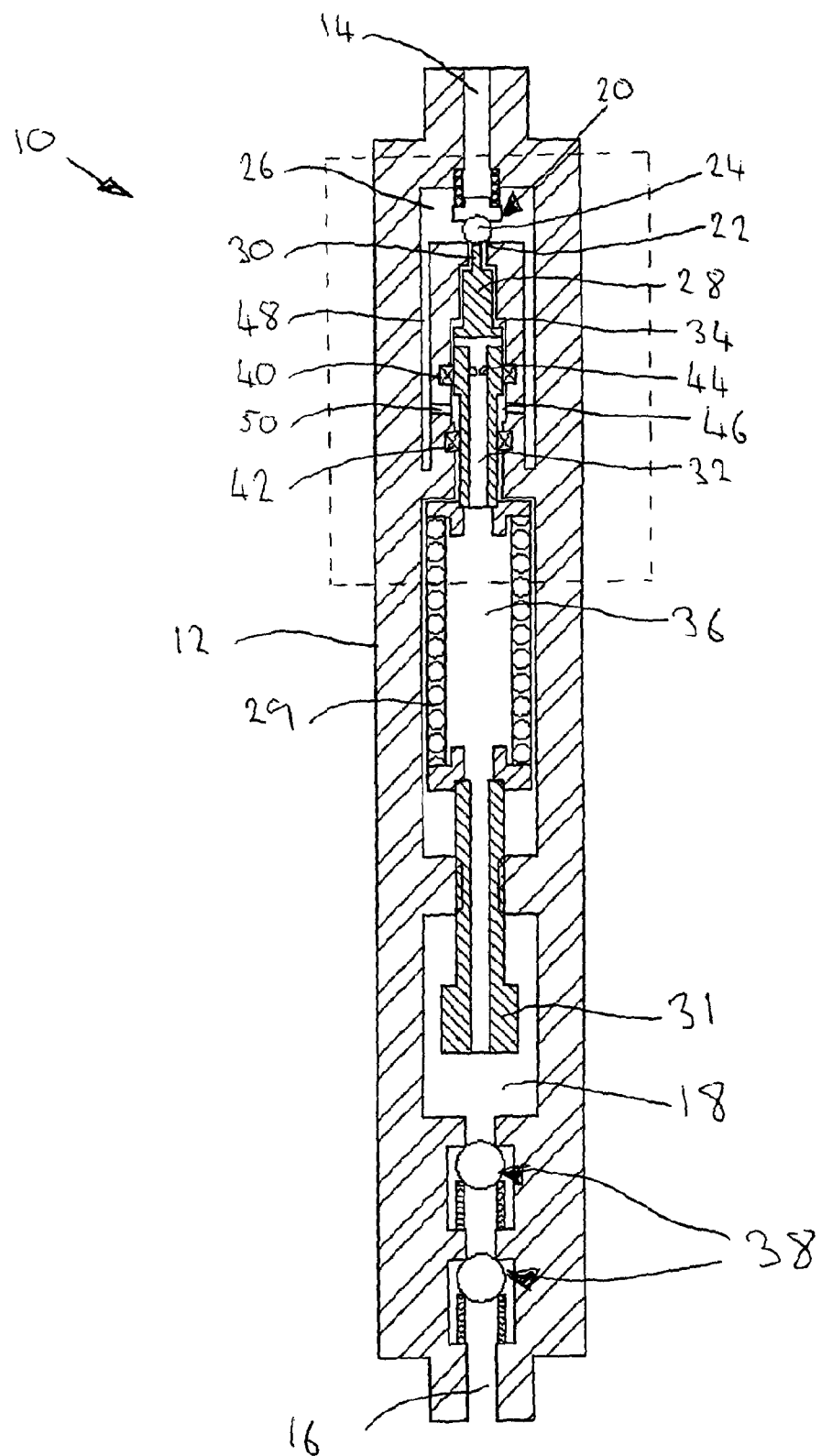
FIG. 3 is a diagrammatic cross-sectional view of a flow regulator device in accordance with an embodiment of the present invention.
Figure 4:
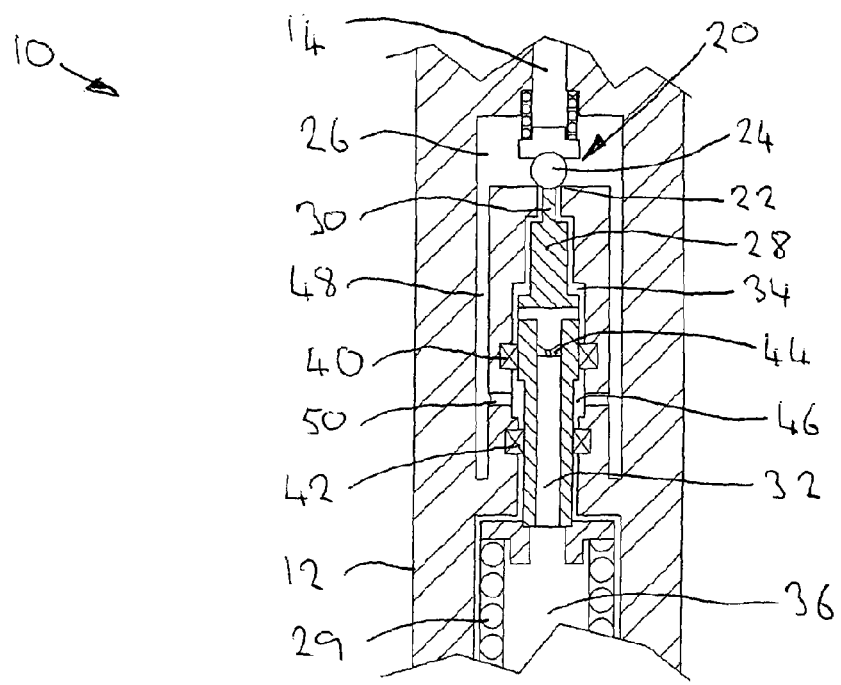
FIG. 4 is an enlarged view of a portion of the apparatus of FIG. 3.

Reference is first made to FIGS. 3 and 4 of the drawings which diagrammatically represent a flow regulator device or apparatus, generally identified by reference numeral 10, in accordance with an embodiment of the present invention. The complete device 10 is shown in FIG. 3, and an enlarged view of the portion identified in broken outline in FIG. 3 is shown in FIG. 4. As will be discussed in more detail below, the device 10 is configured for use in regulating the flow of a fluid from a source to a target region.

The device 10 comprises a housing 12 which defines a fluid inlet 14 configured to communicate with a fluid source, and a fluid outlet 16 configured to communicate with a target location. A flow path 18 extends through the housing from the fluid inlet 14 to the outlet 16, wherein the flow path 18 is defined in part by various components mounted within the housing 12.

An inlet valve assembly 20 is mounted within the inlet 14 and comprises a valve seat 22 and a valve member in the form of a ball 24 which cooperates with the valve seat 22 to regulate flow through the flow path 18. In use, fluid will enter the housing 12 via the inlet 14, specifically into an inlet chamber 26, such that the inlet valve assembly 20 will be exposed to inlet pressure. The effect of the inlet pressure will apply a force on the valve assembly 20 associated with the area of the valve seat 22. As will be discussed in further detail below, the device 10 comprises a balance arrangement configured to balance the effect of this force on the inlet valve assembly 20, permitting operation of the inlet valve assembly 20 to achieve a more consistent flow rate through the device 10.

The apparatus 10 further comprises a flow control member in the form of a pin 28 which is moveably mounted within the flow path 18. The flow control pin 28 comprises an upper finger 30 configured to engage the ball 24 to move the ball 24 relative to the seat 22 to thus vary the flow through the inlet valve assembly 20 from the inlet chamber 26. As will be discussed in further detail below, the flow control pin 28 is caused to move in reaction to fluctuations in pressures, such as pressures at the source and or target locations, to thus vary the flow through the device 10 accordingly to achieve a constant flow rate.

The device 10 further comprises a bias spring 29 which acts to bias the flow control pin 28 in an upstream direction. The force of the bias spring 29 may be adjusted by an adjusting screw 31 to achieve a desired bias force.

The flow control pin 28 comprises an internal conduit 32 which forms part of the flow path 18 through the housing 12, wherein the conduit 32 is configured to provide communication between a first or upstream fluid chamber 34 and a second or downstream fluid chamber 36. The upstream fluid chamber 34 is configured to receive flow from the inlet 14 and inlet chamber 26 via the inlet valve assembly 20. The downstream fluid chamber 34 communicates with the outlet 16 via a pair of non-return check valves 38. The pin 28 moves within a dynamic sealing arrangement which comprises an upper seal 40 and a lower seal 42, wherein the seal arrangement is configured to isolate the upstream and downstream fluid chambers 34, 36.

A flow restrictor 44 having a restriction to flow is located within the internal conduit 32 of the flow control pin 28. In the embodiment shown the flow restrictor 44 comprises a fixed restriction to flow. This fixed restriction to flow may be achieved by a permanently fixed flow restrictor. Alternatively, this fixed restriction to flow may be achieved by an adjustable flow restrictor, configured to establish the fixed restriction.

The flow restrictor 44 will function to establish a flow rate through the device 10, wherein the flow rate may be formulaically expressed by:

$$Q = K\sqrt{\frac{\Delta P}{Sg}}$$

Where:
Q=flow rate
K=flow coefficient of the flow restrictor
ΔP=the differential pressure over the flow restrictor
Sg=specific gravity of the fluid.

In typical use the specific gravity of the fluid flowing through the device 10 will be constant, and as noted above in the present embodiment the flow restrictor 44 comprises a fixed restriction to flow, such that the flow coefficient of the flow restrictor 44 will also be constant. Accordingly, the flow rate will be a function, generally, of the pressure differential across the restrictor 44, which will be the pressure differential between the upstream and downstream chambers 34, 36. Consequently, variations in the pressure differential between the upstream and downstream chambers 34, 36 will result in variations in the flow rate. However, in the present embodiment the flow control pin 28 is configured to operate to maintain a constant pressure differential, thus achieving a constant flow rate.

In use, the flow control pin 28 will be exposed to a number of different forces. Specifically, the pin 28 will be exposed to forces acting in a downstream direction established by the pressure within the upstream fluid chamber 34 which acts over the area of the upper seal 40. In this respect, the upstream chamber 34 will be exposed to a pressure associated with the flow provided via the inlet valve assembly 20 and a back pressure established by flow through the flow restrictor 44. Further, the pin 28 will be exposed to forces acting in an upstream direction established by a combination of the pressure within the downstream chamber 36 acting over the area of the lower seal 42 and the force of the bias spring 29. In this respect the downstream chamber 36 will be exposed to a pressure associated with the target location. Accordingly, for the flow control member to achieve force equilibrium, the forces applied in the downstream direction must equal and oppose the forces applied in the upstream direction. As such, when in a state of equilibrium, the pressure within the upstream chamber 34 will be larger than the pressure within the downstream chamber 36 by an amount corresponding to the force applied by the bias spring. Accordingly, in an equilibrium condition the pressure differential across the flow restrictor 44 will be fixed, determined by the force of the bias spring 29, thus providing a fixed flow rate.

If variations in pressure occur, for example variations in pressure at a fluid source or target location, a resulting force imbalance will cause the flow control member 28 to be displaced, thus varying the inlet valve assembly 20 by engagement of the finger 30 and ball 24 to adjust the flow entering the upstream chamber 34 and thus modify the fluid pressure therein. This self adjustment will continue until equilibrium is again attained and the constant pressure differential associated with the force of the bias spring 29 is achieved.

As noted above, the device 10 includes a balance arrangement configured to balance the effect of the inlet pressure on the inlet valve assembly 20. The configuration and operation of the balance arrangement will now be described, with continued reference to FIGS. 3 and 4.

A balance chamber 46 is defined between the upper and lower seals 40, 42 of the seal arrangement and is configured to be exposed to fluid pressure within the inlet chamber 26 via an annular flow path 48 and a plurality of ports 50. The portion of the flow control member 28 which is positioned between the upper and lower seals 40, 42 defines an annular piston area, which in the embodiment shown is equivalent to the area of the valve seat 22 of the inlet valve assembly 20. Accordingly, in use, the inlet pressure will be applied to equal and opposing areas, thus establishing a balance of forces and neutralising the effect of the inlet pressure acting on the inlet valve assembly over the area of the valve seat 22. That is, when the inlet valve 22 is closed with the ball 24 engaged with the seat 22, the inlet pressure will apply a force against the ball 24 over the area of the seat 22. Accordingly, the flow control pin 28 must overcome this applied force in order to lift the ball 24 from its seat 22 in order to seek to maintain a constant pressure differential across the flow restrictor 44. This requirement to overcome the force applied on the inlet valve assembly 20 may result in a varying pressure differential being achieved, which will establish a varying flow rate through the device 10. However, this effect is eliminated by the inlet pressure applying an equal and opposite force on the flow control member 28 via the annular piston area.

Figure 5:
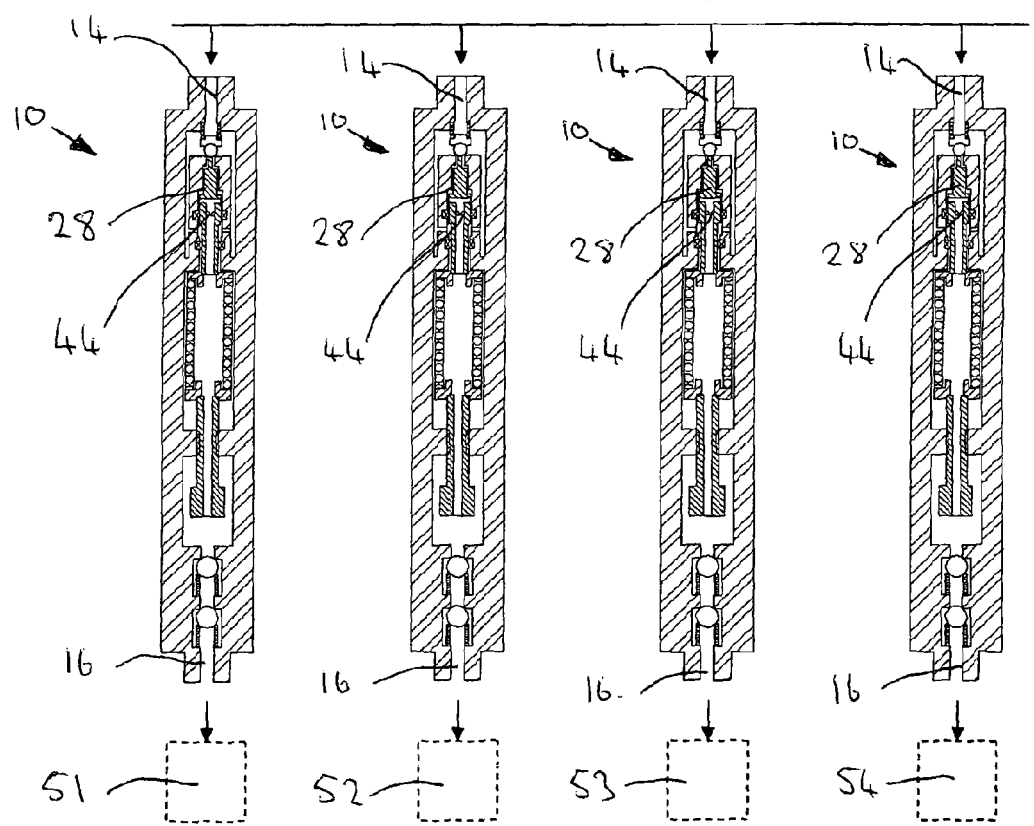
FIG. 5 represents an injection arrangement comprising multiple devices shown in FIG. 3.

The device 10 described above may be used in numerous industries where fluid is to be delivered at a desired, for example constant flow rate from a source to a target location. In one use the device 10 may form part of a system for injecting fluid from a common source into multiple target locations of different pressures. Such an exemplary system will now be described with reference to FIG. 5.

The system comprises a plurality of devices 10 which are identical to device 10 first shown in FIG. 3. The inlet 14 of each device 10 is coupled to a common conduit 56, or rail, which delivers fluid from a common source. The outlet 16 of each device is coupled to a respective target region 51, 52, 53, 54 which may be at different pressures. In use, the flow control pin 28 of each device 10 will operate to establish a fixed pressure differential across the respective flow restrictors 44 to thus achieve a desired, for example fixed flow rate into each target region 51, 52, 53, 54.

Figure 6:
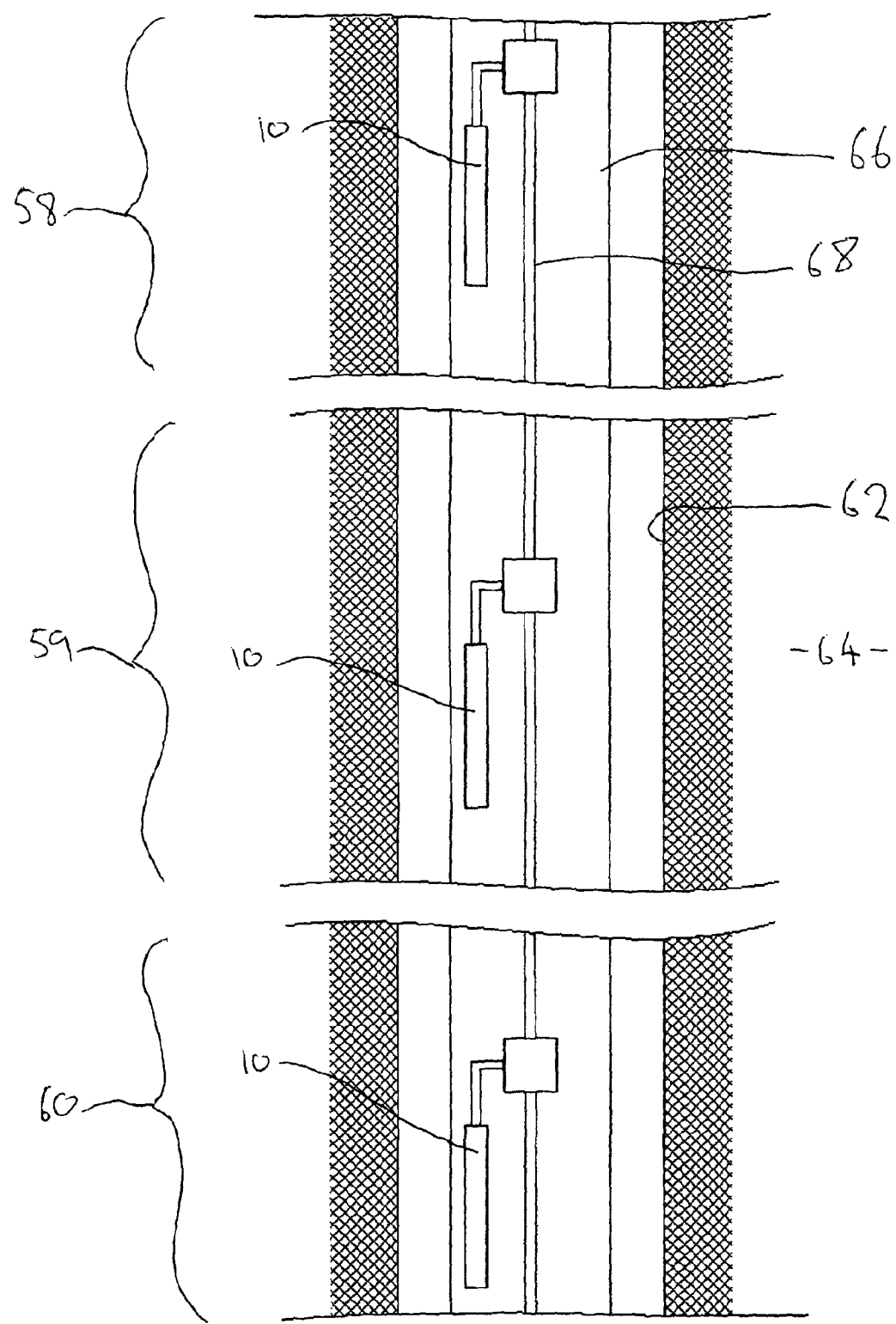
FIG. 6 provides a diagrammatic representation of a downhole fluid delivery system in accordance with an embodiment of the present invention.

Such a multiple target or node injection may be of application in many industries. For example, for use in injecting odour into a flow of natural gas at multiple locations, for use in injecting fuel into multiple combustion regions of a combustion engine, for use in injecting a lubricant into multiple regions of a sealing assembly, and the like. A further exemplary application is illustrated in FIG. 6, and involves the injection of a fluid, such as a chemical, for example acid, into multiple zones 58, 59, 60 along a wellbore 62 which extends through a subterranean formation 64, such as a hydrocarbon bearing formation. In this exemplary application multiple devices 10 are mounted along the length of a completion arrangement 66, each within a zone of interest 58, 59, 60, and are each coupled to a common conduit 68 which delivers fluid from a common source, for example from a source located at surface. In use, each device 10 is operable to inject the fluid supplied from the common conduit 68 into each respective zone 58, 59, 60 at a desired, for example constant flow rate, irrespective of the pressures and pressure fluctuations in either or both of the common conduit 68 and individual zones 58, 59, 60.

Figure 7:
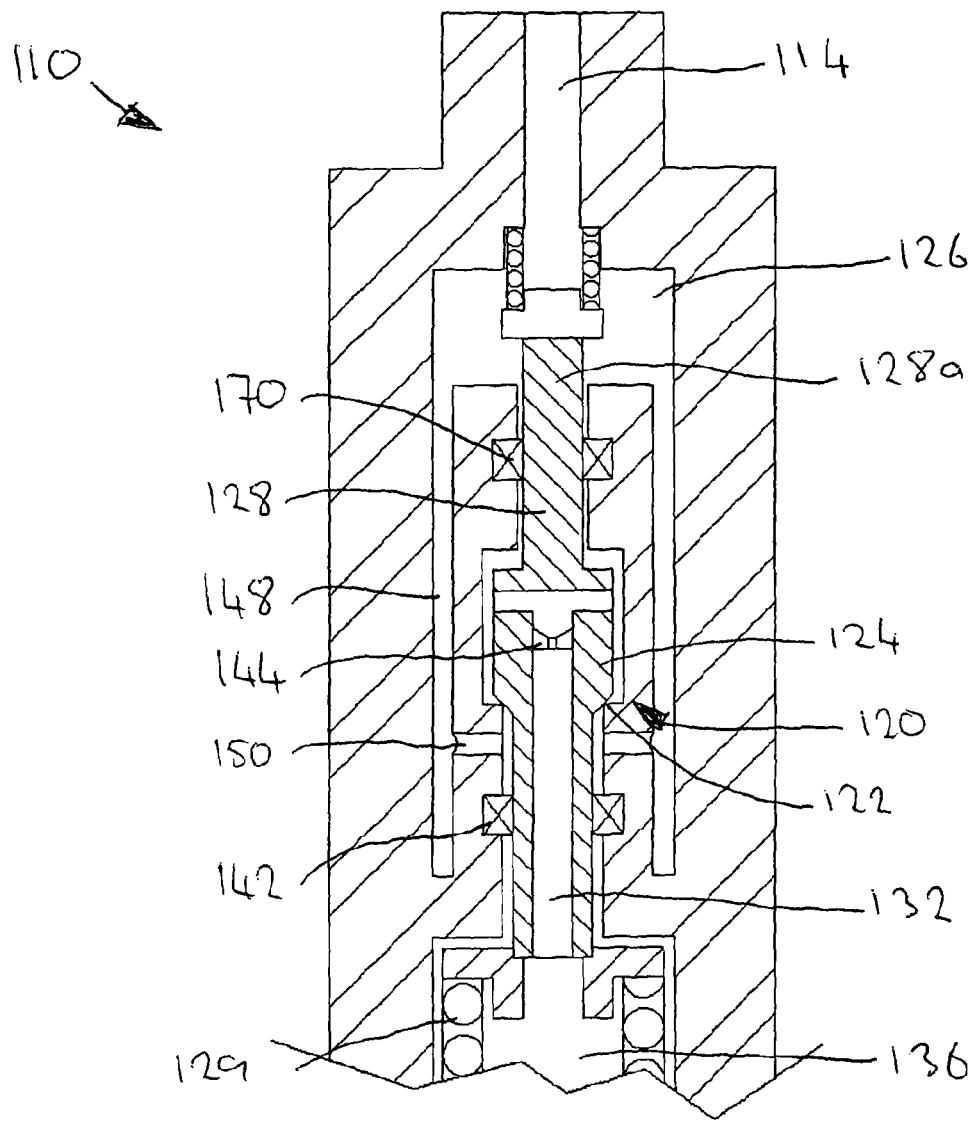
FIG. 7 is a cross-sectional view of a portion of a flow regulator device in accordance with an alternative embodiment of the present invention.

Reference is now made to FIG. 7 in which there is shown a portion of a flow regulator device, generally identified by reference numeral 110, in accordance with an alternative embodiment of the present invention. Device 110 is similar to device 10 first shown in FIG. 3 and as such for clarity and brevity like features share like reference numerals, incremented by 100. Furthermore, it should be noted that the device 110 functions in a similar manner to device 10, and as such no further specific description will be given, except for the purposes of identifying the general differences.

Device 110 comprises a flow control pin 128 which defines an internal conduit 132 having a flow restrictor 144 contained therein. An inlet valve assembly 120 is provided by a valve member 124 integrally formed with the pin 128 and a valve seat 122. Fluid from an inlet 114 enters an inlet chamber 126 and flows via an annular flow path 148 and plurality of ports 150 to communicate with the inlet valve assembly 120. When the valve member 124 is disengaged from the seat 122 fluid flow is permitted through the internal conduit 132 of the pin and across the flow restrictor 144, and into a downstream chamber 136 in communication with a fluid outlet (not shown). Fluid passing through the flow restrictor 144 will establish a back pressure applying a downward force on the pin. Fluid pressure within the downstream chamber 136 will apply an upward force on the pin 128 across the area of a lower seal 142. Additionally, a bias spring 129 will apply an upward force on the pin 128. Thus, in use the pin will seek a force equilibrium position in which the downward force applied by the back pressure is equal and opposite to the combined force supplied by the pressure within the downstream chamber 136 and the force of the spring 129. As such, the pressure differential across the flow restrictor 144 in this equilibrium position will be constant, resulting in a desired, for example constant flow rate through the device 110. If any pressure fluctuations are experienced the pin 128 will self adjust to vary the valve member 124 relative to its seat 122 to again achieve an equilibrium position in which the pressure differential is determined by the force of the spring 129.

During use, fluid at inlet pressure will act against the valve member 124 over the area of the valve seat 122 to thus establish an upward force, which may cause adverse effects on the ability of the device 110 to maintain a fixed pressure differential across the flow restrictor 144. To address this the device 110 comprises a balance arrangement which seeks to balance the forces applied on the inlet valve assembly 120 by the inlet pressure. In this respect the flow control pin 128 comprises an extension 128a which extends through a seal 170 which defines an area equivalent to the area of the valve seat 122. The seal 170 and pin extension 128a in use are exposed to inlet pressure such that the downward force applied on the pin 128 via the pin extension 128a and seal 170 is equivalent and opposite to the upward force applied on the valve member 124 over the area of the valve seat 122.

The apparatus of the present invention provides significant advantages over known arrangements. For example, the present invention permits a flow regulator to be formed with minimal outer dimensions in that large piston area ratios are not required to minimise the effects undesired forces. This may therefore permit the use of the present invention in environments where space is at a premium, such as in downhole environments where prior art devices are not suitable. Further, the incorporation of a flow regulator to achieve a desired flow rate within the device, and particularly within a flow control member provides further advantages in terms of creating a compact arrangement with minimal separate components.

It should be understood that the embodiments described herein are merely exemplary and that various modifications may be made thereto without departing from the scope of the invention. For example, the device may be used in any application where flow regulation between a source and target location is required. Additionally, the housing of the device may be formed in multiple components, wherein each housing component may provide an individual part of the device. Furthermore, in some embodiments the area of the valve seat may not be exactly matched by a balance area. For example, in some cases different areas may be established to achieve a preferred bias force within the device. Furthermore, the flow restrictor in the embodiments described may be configured to be variable to provide a variable restriction to flow. This may permit the flow rate through the device to be modified, for example to establish a required flow profile, permit different uses of the device or the like.

The invention claimed is:

1. An apparatus for regulating the flow of a fluid from a source to a target location, comprising:
   a housing defining a fluid inlet for communicating with a fluid source and a fluid outlet for communicating with a target location;
   a flow path extending between the fluid inlet and fluid outlet;
   a valve assembly mounted in the flow path and comprising a valve seat and a valve member which cooperates with the valve seat to regulate flow through the flow path;
   a flow control member moveably mounted within the housing to operate the valve assembly by moving the valve member relative to the valve seat to vary the flow through the flow path, wherein the flow control member comprises an internal conduit defining a portion of the flow path such that fluid flows from the fluid inlet to the fluid outlet via the internal conduit of the flow control member;
   a balance arrangement for balancing the effect of fluid pressure acting on the valve assembly; and
   wherein the valve assembly and the balance arrangement are exposed to a common fluid pressure.

2. The apparatus according to claim 1, wherein the balance arrangement balances the effect of fluid pressure acting on the area of the valve seat.

3. The apparatus according to claim 1, wherein the flow control member is displaceable by variations in fluid pressure, including variations in at least one of the source fluid pressure and target region fluid pressure.

4. The apparatus according to claim 1, wherein the flow control member operates the valve assembly to achieve a constant pressure differential across the flow control member.

5. A fluid delivery system, comprising:
   a common fluid source;
   at least two apparatus according to claim 1, wherein the fluid inlet of each apparatus is coupled to the common fluid source, and the outlet of each apparatus is coupled to respective target locations.

6. The apparatus according to claim 1, wherein the valve seat of the valve assembly is fixed, and the valve member is moveable relative to the valve seat.

7. The apparatus according to claim 1, wherein the valve seat of the valve assembly defines a fluid opening.

8. The apparatus according to claim 1, wherein the valve assembly comprises an inlet valve assembly.

9. The apparatus according to claim 1, wherein the fluid inlet is provided at one axial end of the housing and the fluid outlet is provided at an opposite axial end of the housing.

10. The apparatus according to claim 1, wherein the apparatus is a downhole apparatus for regulating the flow of a fluid from a source to a downhole target location.

11. The apparatus according to claim 1, comprising a flow restrictor.

12. The apparatus according to claim 11, wherein the flow restrictor is within the flow control member.

13. The apparatus according to claim 12, wherein the flow restrictor is mounted within the internal conduit of the flow control member which extends between first and second chambers on either side of the flow control member, and the flow restrictor is exposed to a differential pressure between the first and second chambers, which in combination with the dimension of a flow restriction associated with the flow restrictor will determine a flow rate through the apparatus.

14. The apparatus according to claim 1, wherein the balance arrangement comprises a piston arrangement defining a piston balance area, wherein the piston balance area and the area of the valve seat are arranged within the apparatus to be exposed to a common pressure.

15. The apparatus according to claim 14, wherein the common pressure comprises fluid inlet pressure.

16. The apparatus according to claim 14, wherein the piston balance area is selected in accordance with the area of the valve seat.

17. The apparatus according to claim 14, wherein the piston balance area is substantially equal to the area of the valve seat.

18. The apparatus according to claim 1, comprising a first fluid chamber located on one side of flow control member for receiving fluid from the fluid inlet, and a second fluid chamber located on an opposite side of the flow control member for communicating fluid to the fluid outlet.

19. The apparatus according to claim 18, wherein fluid pressure within the first fluid chamber generates an associated force on the flow control member to bias said member in a downstream direction, and fluid pressure within the second fluid chamber generates an associated force on the flow control member to bias said member in an upstream direction.

20. The apparatus according to claim 18, wherein the flow control member is displaceable by fluid pressure within the first and second fluid chambers.

21. The apparatus according to claim 18, wherein the valve seat defines an opening into the first chamber from the fluid inlet.

22. The apparatus according to claim 18, wherein the first fluid chamber is for receiving fluid from the valve assembly.

23. The apparatus according to claim 18, wherein the flow control member operates the valve assembly to vary fluid pressure within one of the first and second fluid chambers to provide a substantially constant pressure differential across the flow restrictor.

24. The apparatus according to claim 18, comprising a seal arrangement for isolating the first and second fluid chambers.

25. The apparatus according to claim 24, wherein the seal arrangement establishes defined piston areas associated with the flow control member, wherein fluid pressure acting over the associated piston areas establishes a corresponding force on the flow control member.

26. The apparatus according to claim 1, comprising a bias arrangement for applying a bias force to the flow control member in a preferred direction, wherein the bias force establishes a differential pressure across the flow control member.

27. The apparatus according to claim 26, wherein the bias arrangement applies a bias force to the flow control member in an upstream direction.

28. The apparatus according to claim 26, wherein the bias arrangement provides a fixed bias force.

29. The apparatus according to claim 26, wherein the bias arrangement provides a variable bias force.

30. The apparatus according to claim 26, wherein the bias arrangement is variable to vary the bias force.

31. The apparatus according to claim 26, comprising an adjustor for adjusting the bias force of the bias arrangement.

32. The apparatus according to claim 1, wherein the balance arrangement is at least partially provided or defined by the flow control member.

33. The apparatus according to claim 32, wherein the flow control member defines a piston balance area, wherein the piston balance area and valve assembly are arranged within the apparatus to be exposed to a common pressure.

34. The apparatus according to claim 33, wherein the piston balance area is established by a profiled section on the flow control member.

35. The apparatus according to claim 33, wherein the piston balance area is associated with a sealing arrangement, and is provided between two seals of a sealing arrangement, wherein the two seals define a differential piston area corresponding to the piston balance area.

36. A method for regulating flow between a source and a target location, comprising:
providing an apparatus comprising:
a housing defining a fluid inlet for communicating with a fluid source and a fluid outlet for communicating with a target location;
a flow path extending between the fluid inlet and fluid outlet;
a valve assembly mounted in the flow path and comprising a valve seat and a valve member which cooperates with the valve seat to regulate flow through the flow path;
a flow control member moveably mounted within the housing to operate the valve assembly by moving the valve member relative to the valve seat to vary the flow through the flow path, wherein the flow control member comprises an internal conduit defining a portion of the flow path; and
a balance arrangement,
wherein the method further comprises:
delivering fluid into the fluid inlet to flow via the valve assembly and the internal conduit of the flow control member towards the fluid outlet; and
exposing the valve assembly and the balance arrangement to a common fluid pressure to balance the effect of fluid pressure acting on valve assembly.

37. A method for regulating flow between a source and a target location, comprising:
providing an apparatus comprising:
a housing defining a fluid inlet for communicating with a fluid source and a fluid outlet for communicating with a target location;
a flow path extending between the fluid inlet and fluid outlet;
a valve assembly mounted in the flow path and comprising a valve seat and a valve member which cooperates with the valve seat to regulate flow through the flow path;
a flow control member moveably mounted within the housing to operate the valve assembly by moving the valve member relative to the valve seat to vary the flow through the flow path, wherein the flow control member comprises an internal conduit defining a portion of the flow path such that fluid flows from the fluid inlet to the fluid outlet via the internal conduit of the flow control member;
a first fluid chamber located on one side of flow control member for receiving fluid from the fluid inlet, and a second fluid chamber located on an opposite side of the flow control member for communicating fluid to the fluid outlet, wherein the flow control member is displaceable by fluid pressure within the first and second fluid chambers; and
a flow restrictor mounted within the internal conduit of the flow control member and configured to be exposed to a pressure differential across said flow restrictor,
wherein the method further comprises:
flowing a fluid through the apparatus such that the flow control member moves to operate the valve assembly to vary fluid pressure within one of the first and second fluid chambers to maintain a substantially constant pressure differential across the flow restrictor.

38. An apparatus for regulating the flow of a fluid from a source to a target location, comprising:
a housing defining a fluid inlet for communicating with a fluid source and a fluid outlet for communicating with a target location;
a flow path extending between the fluid inlet and fluid outlet;
a valve assembly mounted in the flow path and comprising a valve seat and a valve member which cooperates with the valve seat to regulate flow through the flow path;
a flow control member moveably mounted within the housing to operate the valve assembly by moving the valve member relative to the valve seat to vary the flow through the flow path, wherein the flow control member comprises an internal conduit defining a portion of the flow path such that fluid flows from the fluid inlet to the fluid outlet via the internal conduit of the flow control member;
a first fluid chamber located on one side of flow control member for receiving fluid from the fluid inlet, and a second fluid chamber located on an opposite side of the flow control member for communicating fluid to the fluid outlet, wherein the flow control member is displaceable by fluid pressure within the first and second fluid chambers; and
a flow restrictor mounted within the internal conduit of the flow control member and configured to be exposed to a pressure differential across said flow restrictor,
wherein the flow control member operates the valve assembly to vary fluid pressure within one of the first and second fluid chambers to maintain a substantially constant pressure differential across the flow restrictor.

39. The apparatus according to claim 38, wherein the flow restrictor defines a fixed restriction to flow.

40. The apparatus according to claim 38, wherein the flow restrictor defines a variable restriction to flow.

* * * * *